United States Patent [19]

Watanabe et al.

[11] Patent Number: 4,833,374

[45] Date of Patent: May 23, 1989

[54] CONTROL CIRCUIT FOR BRUSHLESS ELECTRIC MOTOR

[75] Inventors: Tooru Watanabe; Minoru Shimizu, both of Iida, Japan

[73] Assignee: Tamagawa Seiki Kabushiki Kaisha, Tokyo, Japan

[21] Appl. No.: 181,913

[22] Filed: Apr. 15, 1988

[30] Foreign Application Priority Data

May 29, 1987 [JP] Japan .................. 62-131839

[51] Int. Cl.$^4$ .................. H02P 6/02
[52] U.S. Cl. .................. 318/254; 318/138
[58] Field of Search .................. 318/138, 254, 439

[56] References Cited

U.S. PATENT DOCUMENTS

| 4,641,066 | 2/1987 | Nagata et al. | 318/254 |
| 4,665,350 | 5/1987 | Angi et al. | 318/254 |
| 4,749,923 | 6/1988 | Chieng | 318/254 X |

Primary Examiner—Bentsu Ro

Attorney, Agent, or Firm—Brooks Haidt Haffner & Delahunty

[57] ABSTRACT

A control circuit for a brushless electric motor includes a pulse width modulator for applying drive signals to a gate drive circuit according to from a current amplifier, multi-phase drive coils connected to the gate drive circuit through an inverter circuit, a comparator connected to the current amplifier, a flip-flop for applying output signals from the comparator and drive signals form the pulse width modulator, and a circuit portion for applying signals for switching the direction of rotation from the flip-flop to the gate drive circuit. A preceding signal for switching the direction of rotation is maintained in the flip-flop until the dead zone of the pulse width modulating circuit is elapsed and a new signal for switching the direction of rotation is generated in synchronism with a pulse signal produced by the pulse width modulating circuit so as to be supplied to the gate drive circuit.

3 Claims, 4 Drawing Sheets

CONTROL CIRCUIT FOR BRUSHLESS ELECTRIC MOTOR

BACKGROUND OF THE INVENTION

1. Field of the Invention

This invention relates to a control circuit for a brushless electric motor and more particularly to a novel improvement in which the preceding signal is maintained until the dead zone is elapsed and the signal for switching the direction of rotation is supplied to the gate drive circuit only in synchronism with the pulse generated by the pulse width modulating circuit (PWM circuit).

2. Prior Art

There are a variety of control circuits for brushless electric motors of the above type which are so far known and employed in the art. Typical of these is a system as shown in FIG. 1 and tentatively produced by the present assignee for use within the assignee's company, although the title of the literature showing the structure is not given herein.

Now referring to FIG. 1, the numeral 1 denotes a current amplifier adapted for amplifying the electric current from a current input terminal 2. The signals 1a from the current amplifier 1 are input to a pulse width modulating circuit or PWM circuit 3 and to a comparator 4.

The pulse signals 3a from the PWM circuit 3 are applied to a gate drive circuit 5, while signals 4a for switching the direction of rotation are supplied from the comparator 4 to the gate drive circuit 5.

To the output side of the gate drive circuit 5, there is connected an inverter circuit 6 consisting of six switching transistors $Q_1$ to $Q_6$. An electrical source 7 is connected to these switching transistors $Q_1$ to $Q_6$, while a diode 8 is conneeted across the emitter and the collector of each of the switching transistors $Q_1$ to $Q_6$.

The inverter circuit 6 is so arranged and designed that the switching transistors $Q_1$ and $Q_2$ control a U-phase drive coil 9, the switching transistors $Q_3$ and $Q_4$ control a V-phase drive coil 10 and the switching transistors $Q_5$ and $Q_6$ control a W-phase drive coil 11.

These U-, V- and W-phase drive coils 9, 10 and 11 constitute a stator winding 14 applied to a stator iron core 13 of a brushless electric motor shown in FIG. 4.

A rotor shaft 20 made fast with a rotor 19 including a rotor iron core 17 and a permanent magnet 18 is rotatably mounted between bearings 16, 16 of a frame 15 of the burhsless electric motor 12. The extreme end of the rotor shaft 20 is made fast with a Hall rotor 22 including a permanent magnet 21. Within the motor frame 15, there is provided a Hall assembly 24 having a Hall element 23 operatively associated with the permanent magnet 21. The Hall rotor 22 and the Hall assembly 24 constitute a rectification signal generator 25. An encoder 12a is provided on the outer side of the generator 25.

The rectified signals obtained from the generator 25 are applied to the gate drive circuit 5.

The U-, V- and W-phase drive coils 9–11 are respectively provided with current sensors 9a, 10a and 11a connected in turn to a current sensor circuit 26, the output of which is supplied to the input terminal 2.

The above-described prior art brushless electric motor operates as follows:

When the rotor 19 is to be rotated in any one direction, pulse signals 3a from PWM circuit 3 are applied to the gate drive circuit 5 so that the upper switching transistors $Q_1$, $Q_3$ and $Q_5$ or the lower switching transistors $Q_2$, $Q_4$ and $Q_6$ of the inverter circuit 6 are turned on and off, while the lower transistors $Q_2$, $Q_4$ and $Q_6$ or the upper transistors $Q_1$, $Q_3$ and $Q_5$ are turned on and off by the rectified signals 25a for sequentially switching the U-, V- and W-phase drive coils 9, 10 and 11 to effect rotation of the rotor 19.

When the signals for switching the direction of rotation 4a are to be produced, these signals are constituted by the high or low level signals derived from the output signals from the comparator 4 to realize the desired rotational direction of the motor.

Turning now to the waveform diagram of FIG. 3, the operation of switching the rotational direction is explained more specifically.

It is now assumed that, with the output waveform 1a from the current amplifier 1 being as shown at A before time $t_1$, transistor $Q_1$ is turned on, while the transistor $Q_4$ is turned or and off by the pulse signals 3a of the PWM circuit 3.

In such case, the output waveform 1a comes into the dead zone of the PWM circuit 3, such that the transistors $Q_1$ is turned on but the transistor $Q_4$ is turned off.

Then, at time $t_2$, the signal for switching the direction of rotation 4a is produced from the comparator 4 such that the transistor $Q_1$ is turned off while the transistor $Q_3$ is turned on. At this time, the transistors $Q_2$ and $Q_4$ remain in the turned-off state.

Then, at time $t_3$, the output waveform 1a from the current amplifier 1 comes out of the dead zone of the PWM circuit 3, so that the turned-on state of the pulse is initiated.

The above described prior-art brushless electric motor suffers from the following problems. In the operating mode shown in FIG. 3, and at time $t_2$, the current flows through one of the coils 9 to 11 through the diode 8 of the inverter circuit 6 under the counter electromotive force produced by the motor.

Since the time interval $t_1-t_2$ corresponds to the dead zone of the PWM circuit 3, the current does not flow through any one of coils 9–11. However, the current flowing at $t_2$ as described above is sensed by the current sensor circuit 26 so that sensor signals 26a are produced.

After time $t_2$, the output waveform 1a of the current amplifier 1 shifts towards the positive side. As the operating point of the comparator 4 is exceeded, the signal for switching the rotational direction 4a again goes to the low level between time $t_2$ and time $t_3$. Under such conditions, at time $t_3$, although the drive current is supposed to flow by the operation of transistors $Q_3$ and $Q_2$ it flows instead by operation of transistors $Q_1$ and $Q_4$ so that the rotor 19 tries to rotate in the opposite direction. However, because reverse current is caused to flow under the instantaneous operation of the servo, regular operation is resumed after several repetitions of the above described operations.

During that time, the signal for switching the direction of rotation 4a changes, as indicated by the dotted lines in FIG. 3, to create great deal of noise and vibrations.

In this manner, at the time of switching the direction of rotation of the motor, unnecessary mechanical operation occurs, with the result that the user may be disagreeably bothered, while the service life of the motor is also affected adversely.

SUMMARY OF THE INVENTION

It is therefore an object of the present invention to provide a brushless electric motor wherein the preceding signal state is maintained until the dead zone is elapsed and wherein the signal for switching the direction of rotation is produced at the same time that the pulse is generated by the PWM circuit to realize positive and reliable switching of the rotational direction of the motor.

In view of the above object, the present invention provides a control circuit for a brushless electric motor comprising a pulse width modulator for applying drive signals to a gate drive circuit according to signals from a current amplifier, a multi-phase drive coil connected to said gate drive circuit through an inverter circuit, a comparator connected to said current amplifier, a flip-flop for applying output signals from said comparator and drive signals from said pulse width modulator and means for supplying signals for switching the direction of rotation from said flip-flop to said gate drive circuit.

In the control circuit for the brushless electric motor of the present invention, when the signal corresponding to the signal for switching the direction of rotation according to the prior art is issued by the comparator at time $t_2$ which is included within the dead zone of the pulse width generator, this signal is not transmitted to the gate drive circuit, but the preceding signal is maintained. It is only after the time $t_3$ corresponding to the end of the dead zone and in synchronism with the pulse signal issued from the pulse width modulating circuit is the signal for switching the direction of rotation from the flip-flop applied to the gate drive circuit.

In such a manner, no current flows in the motor winding during the dead zone to prevent the disturbances in the signal for switching the direction of rotation from occurring. Since it is only after the lapse of the dead zone that the servo controlled current may flow in each coil, stable switching of the direction of rotation may be achieved without the risk of producing disagreeable sounds or vibrations.

DESCRIPTION OF THE PREFERRED EMBODIMENT

Figure 1:
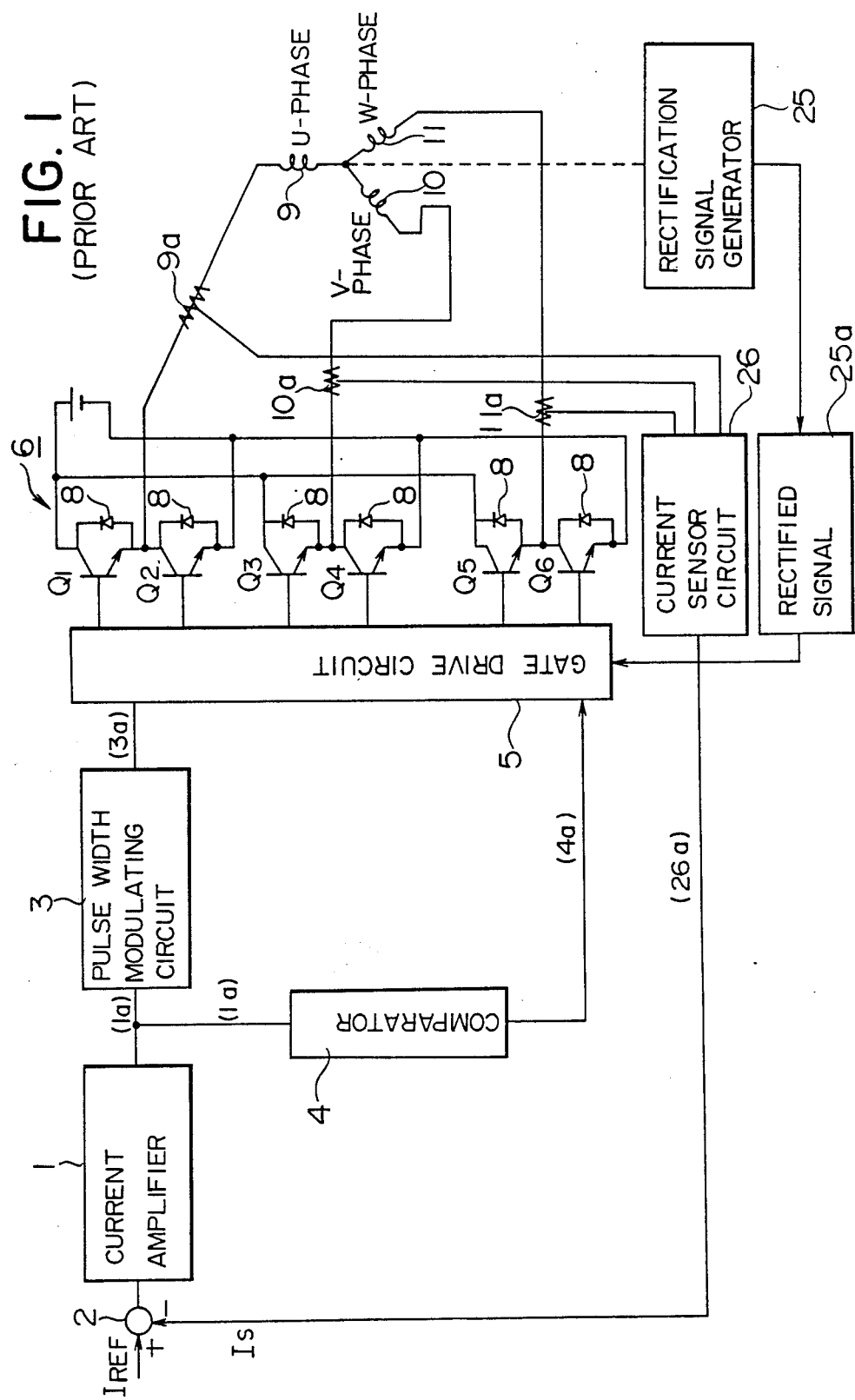
FIG. 1 is a circuit diagram showing the conventional control circuit.

A preferred illustrative embodiment of the brushless electric motor of the present invention will be hereafter explained by referring to the accompanying drawings, wherein parts and components that are the same as or equivalent to those of the above described prior-art are depicted by the same reference numerals.

Figure 2:
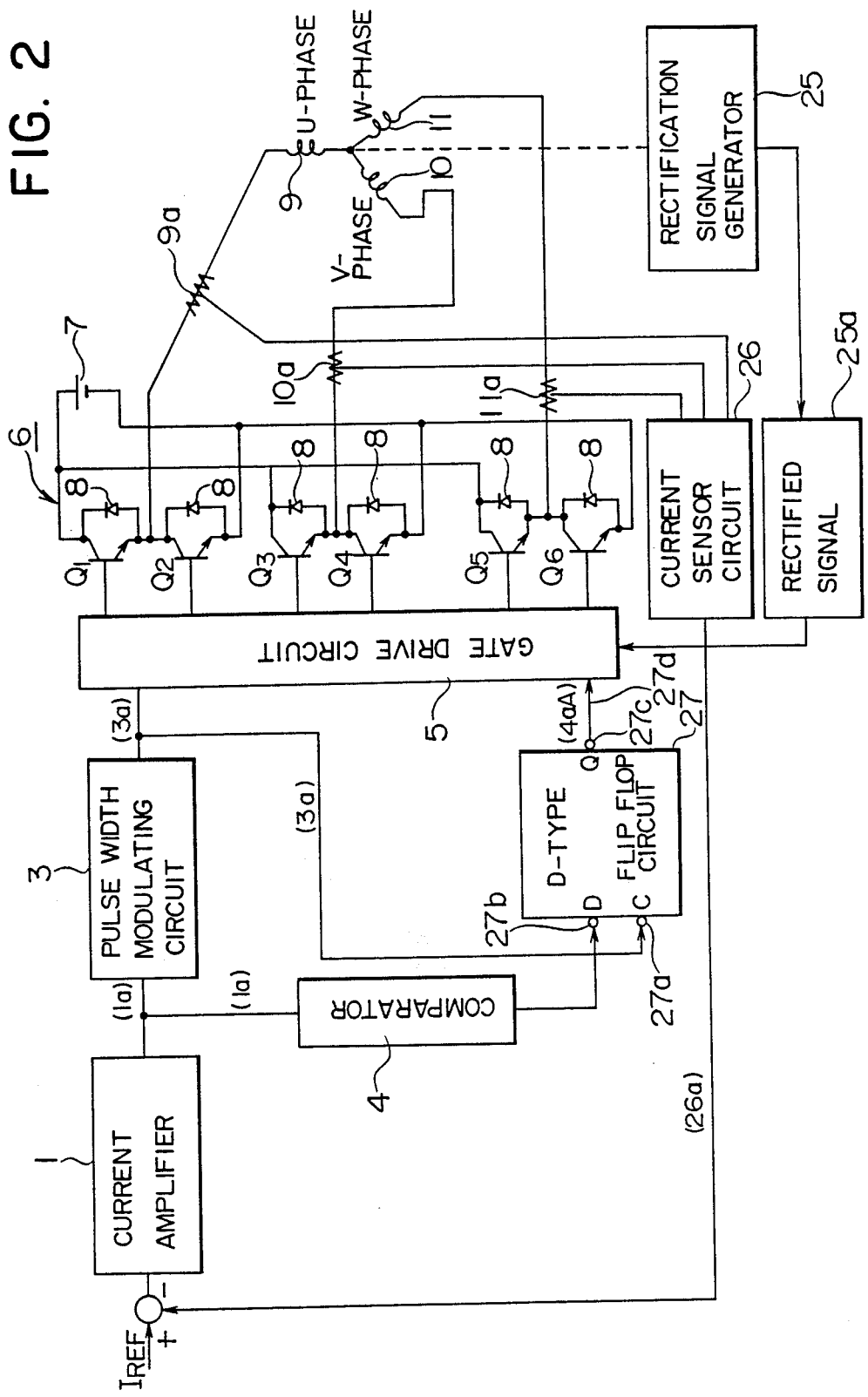
FIG. 2 is a circuit diagram showing the control circuit for the brushless electric motor according to the present invention.

FIG. 2 shows a control circuit for a brushless electric motor according to the present invention. The numeral 1 denotes a current amplifier adapted for amplifying the electric current from a current input terminal 1. The signals 1a from the current amplifier 1 are input to a pulse width modulating circuit or PWM circuit 3 and to a comparator 4.

The pulse signals 3a from the PWM circuit 3 are applied to a gate drive circuit 5 and to a clock input terminal 27a of a D-type flip-flop 27, while the output signals 4a from the comparator 4 corresponding to the signal for changing the direction of rotation for the above described prior-art device are input to a D input terminal 27b of the D-type flip-flop 27.

The signal for changing the direction of rotation 4aA from the output terminal 27c of the D-type flip-flop 27 is supplied to the gate drive circuit 5.

An inverter circuit 6 consisting of six switching transistors $Q_1$ to $Q_6$ is connected to the output side of the gate drive circuit 5. An electric power source 7 is connected to these switching transistors $Q_1$ to $Q_6$, while a diode 8 is connected across the emitter and the collector of each of the switching transistors $Q_1$ to $Q_6$.

The inverter circuit 6 is so arranged and designed that the switching transistors Q1 and Q2 control a U-phase drive coil 9, the switching transistors $Q_3$ and $Q_4$ control a V-phase drive coil 10 and the switching transistors $Q_5$ and $Q_6$ control a W-phase coil 11.

Figure 4:
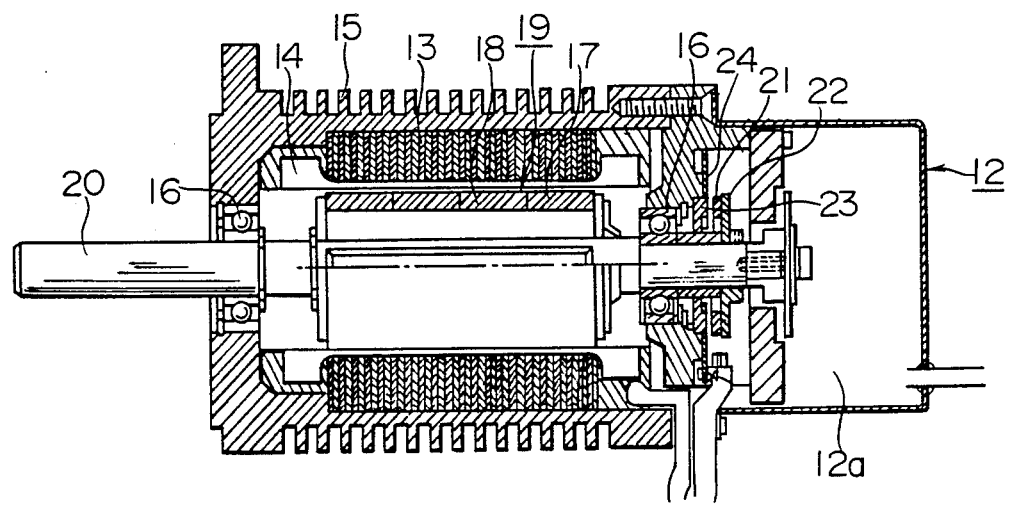
FIG. 4 is a sectional view showing a brushless electric motor to which the circuits of both the prior art and inventive circuits may be applied.

These U-, V- and W-phase drive coils 9, 10 and 11 constitute a stator winding 14 applied to a stator iron core 13 of a brushless electric motor 12 just in the prior art system shown in FIG. 4.

A rotor shaft 20 made fast with a rotor 19 including a rotor iron core 17 and a permanent magnet 18 is rotatably mounted between bearings 16, 16 of a frame 15 of the brushless electric motor 12. The extreme end of the rotor shaft 20 is made fast with a Hall rotor 22 including a permanent magnet 21. Within the motor frame 15, there is provided a Hall assembly 24 having a Hall element 23 operatively associated with the permanent magnet 21. The Hall rotor 22 and the Hall assembly 24 constitute a rectification signal generator 25. An encoder 12a is provided on the outer side of the generator 25.

The rectified signals obtained from the generator 25 are applied to the gate drive circuit 5.

The U, V- and W-phase drive coils 9, 10 and 11 are respectively provided with current sensors 9a, 10a and 11a connected in turn to a current sensor circuit 16, the output of which is supplied to the input terminal 2.

The above described brushless element motor of the present invention operates as follows:

When the rotor 19 is to be rotated in any one direction, pulse signals 3a from the PWM circuit 3 are applied to the gate drive circuit 5 so that the upper switching transistors $Q_1$, $Q_3$ and $Q_5$ or the lower switching transistors $Q_2$, $Q_4$ and $Q_6$ of the inner circuit 6 are turned on and off, while the lower transistors $Q_2$, $Q_4$ and $Q_6$ or the upper transistors $Q_1$, $Q_3$ and $Q_5$ are turned on and off by the rectified signals 25a for sequentially switching the U-, V- and W-phase drive coils 9, 10 and 11 to effect rotation of the rotor 19.

Figure 3:
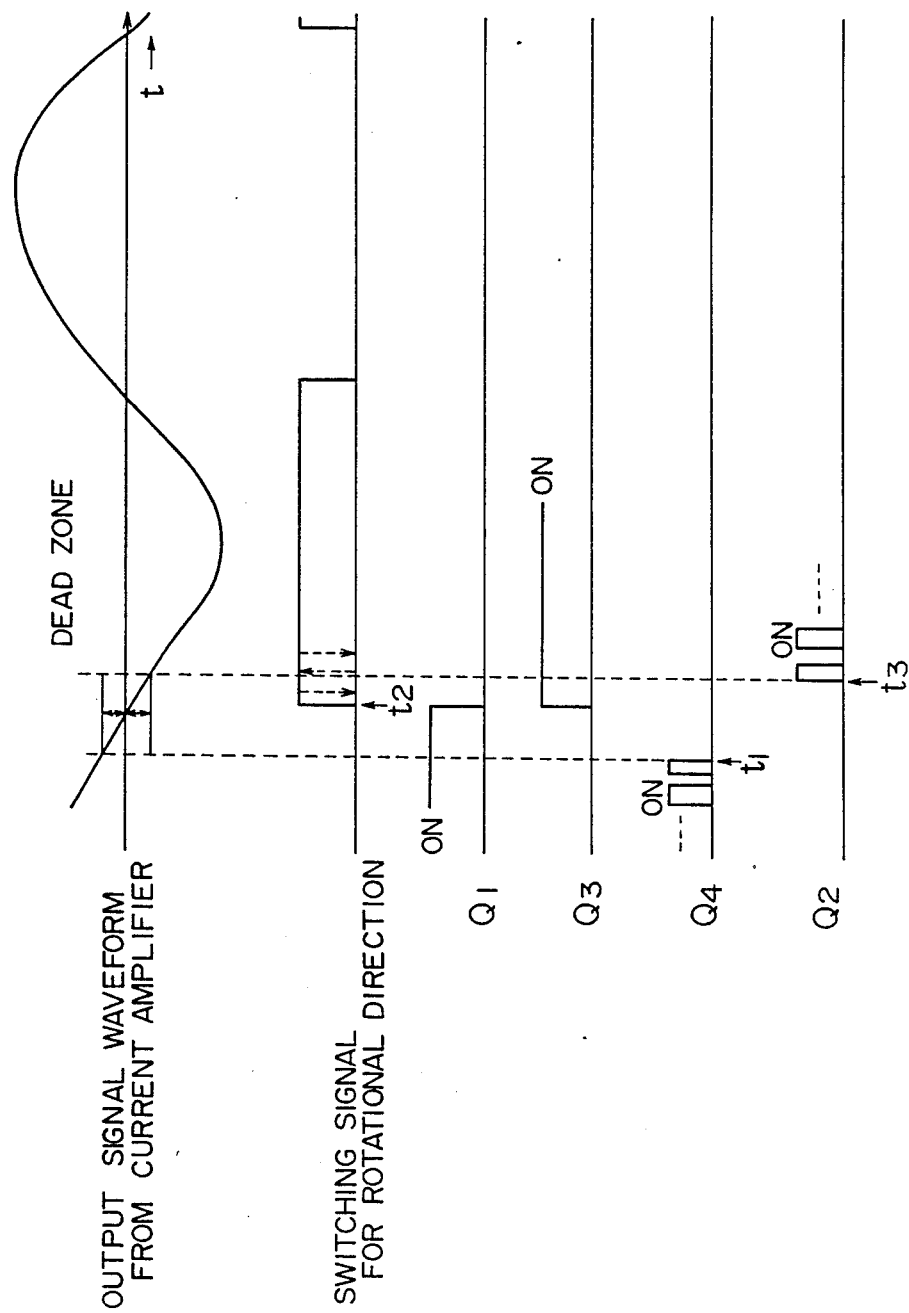
FIG. 3 is a waveform diagram showing the operation of both the prior art and inventive circuits.

When the direction of rotation is to be switched, since the output signal 4a corresponding to the conventional signal for switching the direction of rotation for the case in which the output signal from the comparator 4 is the high level or low level signal input to the D input terminal 27b of the D-type flip-flop 27, the pulse signal 3a from the PWM circuit 3 is not input to the clock input terminal 27a during the dead zone as indicated in the waveform diagram of FIG. 3, even if the output signal 4a of the converter 4 is changed to the high level, so that the preceding signal is maintained in the gate drive circuit 5.

When the current waveform 1*a* from the amplifier 1 comes out of the dead zone, a pulse signal 3*a* is produced from the pulse wave modulating circuit 3 and input to the clock input terminal 27*a*. In timed relation with the pulse signal 3*a*, the signal for switching the direction of rotation 4*a*A is input from the Q output terminal 27*c* to the gate drive circuit 5 such that the operations of the upper and lower transistors $Q_1$ to $Q_6$ of the inverter circuit 6 are switched therebetween to switch the direction of rotation of the rotor 19.

Thus, according to the present invention, when the output signal 4*a* corresponding to the signal for switching the direction of rotation is produced from the comparator 4 at time $t_2$, the state of the preceding signal is maintained in the D-type flip-flop 27 so that it is not transmitted to the gate drive circuit 5. It is only when the pulse signal 3*a* is produced at time $t_3$ from the pulse width modulating circuit 3 that the clock signals start to be input to the D-type flip-flop 27 and, in synchronism therewith, the signal for switching the direction of rotation 4*a*A is input to the gate circuit 5.

In such a manner, as current flows through the coils 9 to 11 so that the signals for switching the direction of rotation are not disturbed. Thus the servo-state current is allowed to flow through each of the coils 9 to 11 at the same time that the dead zone is elapsed, so that acute signal rise may be realized without concomitant generation of sounds or vibrations.

What is claimed is:

1. A control circuit for a brushless electric motor comprising a pulse width modulator for applying drive signals to a gate drive circuit in accordance with signals from a current amplifier, multi-phase drive coils connected to said gate drive circuit through an inverter circuit, a comparator connected to said current amplifier, a flip-flop for receiving output signals from said comparator and drive signals from said pulse width modulator and means for applying signals from said flip-flop to said gate drive circuit for switching the direction of rotation of the brushless motor, wherein a preceding signal is maintained in said flip-flop until a dead zone of said pulse width modulator has passed, whereupon a new signal is generated by said flip-flop in synchronism with a pulse signal produced by said pulse width modulator for application to said gate drive circuit.

2. The control circuit according to claim 1 wherein said flip-flop is a D-type flip-flop.

3. The control circuit according to claim 1 wherein the multi-phase drive coils are three-phase coils.

* * * * *